United States Patent
Pande et al.

(10) Patent No.: US 9,413,423 B1
(45) Date of Patent: Aug. 9, 2016

(54) SNR CALCULATION IN IMPULSIVE NOISE AND ERASURE CHANNELS

(71) Applicant: Texas Instruments Incorporated, Dallas, TX (US)

(72) Inventors: Tarkesh Pande, Richardson, TX (US); Anuj Batra, Mountain View, TX (US); IL Han Kim, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 14/829,615

(22) Filed: Aug. 18, 2015

(51) Int. Cl.
  H04B 17/00 (2015.01)
  H04B 3/46 (2015.01)
  H04B 3/54 (2006.01)
  H04L 1/00 (2006.01)

(52) U.S. Cl.
  CPC .. *H04B 3/46* (2013.01); *H04B 3/54* (2013.01); *H04L 1/0003* (2013.01)

(58) Field of Classification Search
  CPC .......... H04B 3/544; H04B 3/54; H04B 27/04; H04B 17/0006; H04L 1/005; H04L 1/20
  USPC .......... 375/227, 219, 232, 296; 370/242, 252; 714/704
  See application file for complete search history.

(56) References Cited

U.S. PATENT DOCUMENTS 7,295,517 B2    11/2007   Anim-Appiah et al.
2008/0310546 A1*  12/2008  Humphrey ............ H04L 1/0009
                                                375/296
2014/0254643 A1*  9/2014   Tzannes ................ H04L 1/0009
                                                375/219
2016/0078856 A1*  3/2016   Lee ..................... G10L 21/0232
                                                381/94.2

OTHER PUBLICATIONS

Thokozani Shongwe, A. J. Han Vinck and Hendrik C. Ferreira, "On Impulse Noise and its Models", 2014 18th IEEE International Symposium on Power Line Communications and its Applications, Mar. 30-Apr. 2, 2014, pp. 12-17, Glasgow, Scotland.

Sushruth N. Donthi and Neelesh B. Mehta, "An Accurate Model for EESM and its Application to Analysis of CQI Feedback Schemes and Scheduling in LTE", IEEE Transactions on Wireless Communications, vol. 10, No. 10, Oct. 2011, pp. 3436-3438.

(Continued)

*Primary Examiner* — Khai Tran
(74) *Attorney, Agent, or Firm* — Ronald O. Neerings; Frank D. Cimino

(57) ABSTRACT

A device coupled to a noisy channel having periodic impulse noise in a network may estimate an effective signal to noise ratio (SNR) by receiving a packet of symbols. The device may determined a number of bad symbols N(bad) ratio in the packet due to interference and a remaining plurality of good symbols in the packet. An SNR value may be computed based on only the plurality of good symbols in the packet of symbols to form an SNR(good) value. An SNR correction value (SNR (offset)) may be determined as a function of the N(bad) ratio and the SNR(good) value. An effective SNR value may then be calculated by adjusting the SNR(good) value according to SNR(offset).

18 Claims, 7 Drawing Sheets

(56) References Cited

OTHER PUBLICATIONS

"Narrowband Orthogonal Frequency Division Multiplexing Power Line Communication Transceivers for G3-PLC Networks" ITU-T Recommendation G.9903, Series G: Transmission Systems and Media, Digital Systems and Networks, Access Networks—In Premises Networks ITU-T Telecommunication Standardization Sector of ITU, Feb. 2014, pp. 1-226.

Jim Leclare, Arahin Niktash, and Victor Levi, "An Overview, History, and Formation of IEEE P1901.2 for Narrowband OFDM PLC", Maxim Integrated, Application Note 5676, Jul. 2, 2013, pp. 1-7.

* cited by examiner

SNR CALCULATION IN IMPULSIVE NOISE AND ERASURE CHANNELS

FIELD OF THE INVENTION

This invention generally relates to reliable communication between devices, and in particular to communication over power lines.

BACKGROUND OF THE INVENTION

Power Line Communication (PLC) is one of the technologies used for automatic meter reading, for example. Both one-way and two-way systems have been successfully used for decades. Interest in this application has grown substantially in recent history because utility companies have an interest in obtaining fresh data from all metered points in order to better control and operate the utility grid. PLC is one of the technologies being used in Advanced Metering Infrastructure (AMI) systems.

A PLC carrier repeating station is a facility at which a PLC signal on a power line is refreshed. The signal is filtered out from the power line, demodulated and modulated, and then re-injected onto the power line again. Since PLC signals can carry long distances (several 100 kilometers), such facilities typically exist on very long power lines using PLC equipment.

In a one-way system, readings "bubble up" from end devices (such as meters), through the communication infrastructure, to a "master station" which publishes the readings. A one-way system might be lower-cost than a two-way system, but also is difficult to reconfigure should the operating environment change.

In a two-way system, both outbound and inbound traffic is supported. Commands can be broadcast from a master station (outbound) to end devices, such as meters, that may be used for control and reconfiguration of the network, to obtain readings, to convey messages, etc. The device at the end of the network may then respond (inbound) with a message that carries the desired value. Outbound messages injected at a utility substation will propagate to all points downstream. This type of broadcast allows the communication system to simultaneously reach many thousands of devices. Control functions may include monitoring health of the system and commanding power shedding to nodes that have been previously identified as candidates for load shed. PLC also may be a component of a Smart Grid.

The power line channel is very hostile. Channel characteristics and parameters vary with frequency, location, time and the type of equipment connected to it. The lower frequency regions from 10 kHz to 200 kHz are especially susceptible to interference. Furthermore, the power line is a very frequency selective channel. Besides background noise, it is subject to impulsive noise often occurring at 50/60 Hz, and narrowband interference and group delays up to several hundred microseconds.

OFDM is a modulation technique that can efficiently utilize this limited low frequency bandwidth, and thereby allows the use of advanced channel coding techniques. This combination facilitates a very robust communication over a power line channel.

On Sep. 30, 2010, the IEEE's 1901 Broadband Powerline Standard was approved and HomePlug AV, as baseline technology for the FFT-OFDM PHY within the standard, is now ratified and validated as an international standard. The HomePlug Powerline Alliance is a certifying body for IEEE 1901 products. The three major specifications published by HomePlug (HomePlug AV, HomePlug Green PHY and HomePlug AV2) are interoperable and compliant.

Another set of open standards has been developed for power line communication (PLC) at the request of Electricité Réseau Distribution France (ERDF), a wholly owned subsidiary of the EDF (Electricité de France) Group. The set of standards include "PLC G3 Physical Layer Specification," and "PLC G3 MAC Layer Specification." These standards are intended to facilitate the implementation of an automatic meter-management (AMM) infrastructure in France; however, PLC using these standards or similar technology may be used by power utilities worldwide.

The G3 standards promote Interoperability and coexists with IEC 61334, IEEE® P1901, and ITU G.hn systems. 10 kHz to 490 kHz operation complies with FCC band, 10 to 150 kHz operation complies with the CENELEC band, and 10-450 kHz complies with the ARIB band. CENELEC is the European Committee for Electrotechnical Standardization and is responsible for standardization in the electro technical engineering field. ARIB is a Japanese standards organization.

BRIEF DESCRIPTION OF THE DRAWINGS

Particular embodiments in accordance with the invention will now be described, by way of example only, and with reference to the accompanying drawings.

Figure 1:
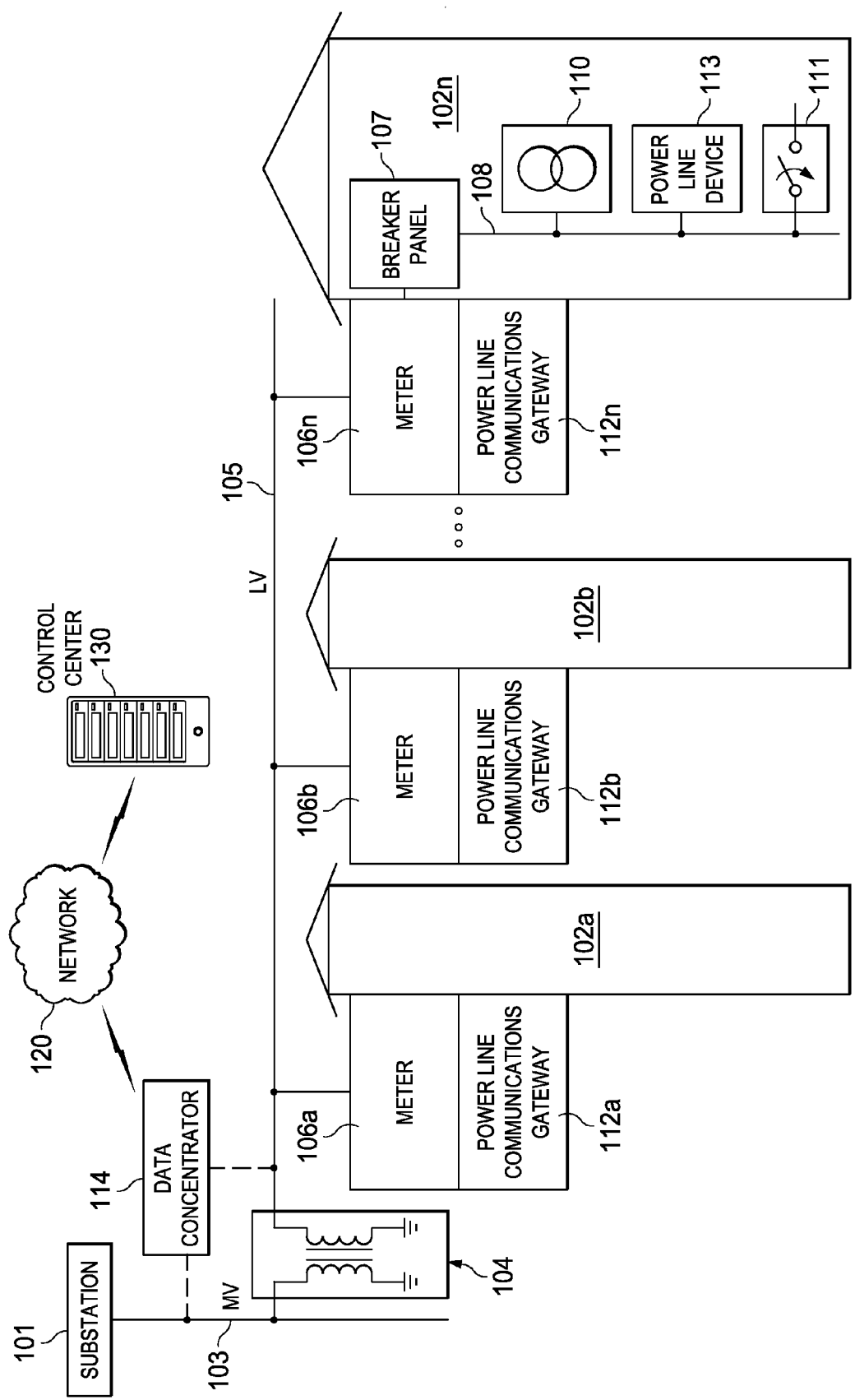
FIG. 1 is a conceptual diagram of a PLC system network.

Other features of the present embodiments will be apparent from the accompanying drawings and from the detailed description that follows.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description Power line communication (PLC) devices operate in the presence of harsh channel and noise environments, such as frequency-selective channels, narrowband interference, and impulsive noise. Traditionally, repetition coding is used to improve the robustness of PLC devices in these harsh environments. However, repetition coding comes at the expense of decreased data rates. As an example, IEEE 1901.2, ITU-G.9903 (G3-PLC) and ITU G.9904 (PRIME) all have a mode, called ROBO or Robust mode, where the information bit is repeated 4 times. This repetition coding helps to ensure that a PLC device can connect with other PLC devices even in the presence of the harsh environments.

Embodiments of this disclosure may include a method for computing the effective SNR in a power-line channel which exhibits either impulsive noise or behaves as an erasure channel. The effective SNR may then be used to determine the modulation and coding scheme (MCS) that the link can support, as will be described in more detail below.

G3-PLC device can operate in several bands: CENELEC A (35.9375-90.625 kHz), CENELEC B (98.4375-121.875 kHz), ARIB (154.6875-403.125 kHz) and FCC (154.6875-487.5 kHz) bands. In each of these bands, the critical network messages, such as network formation, routing, management, etc., are sent using either ROBO (repetition by 4) or Super ROBO (repetition by 6) mode.

Within a band of interest, such as CENELEC A: 35.9375-90.625 kHz, for example, the higher 24 tones (54.6875-90.625 kHz) may experience deep fading, which essentially ensures that no information can be received on them. Thus, typically only the lower 12 tones (35.9375-53.125 kHz) may be used to communicate data. This is equivalent to puncturing the higher 24 tones for each OFDM symbol. Note that the information bits, including the repeated bits, are actually transmitted on all 36 tones in ROBO mode. After the channel, the received data stream may look like 12 "received bits" followed by 24 "erased bits" (low signal values, essentially zeros) for each OFDM symbol.

At the receiver, the received data stream is equalized, sliced (calculate soft information), de-interleaved, de-spread (integrating the soft information for the repeated bits), as specified by the G3-PLC or IEEE 1901.2 standard. After these operations, the resulting soft information is sent to a Viterbi decoder. More details about the G3-PLC interleaver/de-interleaver and spreading can be found in the ITU G.9903 02.2014 standard (and future versions), which is incorporated by reference herein.

Power line communication using G3 standards reduces infrastructure costs by allowing transmission on medium voltage lines, for example, 12 kV, for distances of 6 km or more and across transformers with fewer repeaters. Robust operation over noisy channels is provided by an orthogonal frequency division multiplexing (OFDM)-based PHY (physical) layer. The G3 Mac specification is based on the IEEE 802.15.4-2006 "Wireless Medium Access Control (MAC) and Physical Layer (PHY) Specifications for Low-Rate Wireless Personal Area Networks (WPANs)" which is suitable for lower data rates. Two layers of forward error correction and cyber security features are provided. A 6LoW-PAN adaptation layer supports IPv6 packets. An AES-128 cryptographic engine may be included in G3 PLC nodes. Adaptive tone mapping maximizes bandwidth utilization and channel estimation optimizes modulation between neighboring nodes. A mesh routing protocol selects best path between remote nodes. At the MAC layer, a data or command frame may include up to 400 bytes of data. At the PHY layer, a frame may be segmented and transmitted in smaller chunks of data.

The IEEE 1901.2 standard specifies communications for low frequency (less than 500 kHz) narrowband power line devices via alternating current and direct current electric power lines. This standard supports indoor and outdoor communications in the following environments: a.) low voltage lines (less than 1000 v), such as the line between a utility transformer and meter; b) through transformer low-voltage to medium-voltage (1000 V up to 72 kV); and c) through transformer medium-voltage to low-voltage power lines in both urban and in long distance (multi-kilometer) rural communications. The standard uses transmission frequencies less than 500 kHz. Data rates will be scalable to 500 kbps depending on the application requirements. This standard addresses grid to utility meter, electric vehicle to charging station, and within home area networking communications scenarios. Lighting and solar panel power line communications are also potential uses of this communications standard. This standard focuses on the balanced and efficient use of the power line communications channel by all classes of low frequency narrow band (LF NB) devices, defining detailed mechanisms for coexistence between different LF NB standards developing organizations (SDO) technologies, assuring that desired bandwidth may be delivered. This standard assures coexistence with broadband power line (BPL) devices by minimizing out-of-band emissions in frequencies greater than 500 kHz. The standard addresses the necessary security requirements that assure communication privacy and allow use for security sensitive services. This standard defines the physical layer (PHY) and the medium access (MAC) sub-layer of the data link layer, as defined by the International Organization for Standardization (ISO) Open Systems Interconnection (OSI) Basic Reference Model.

FIG. 1 is a conceptual diagram of a PLC system in which an electric power distribution system is depicted. Medium voltage (MV) power lines 103 from substation 101 typically carry voltage in the tens of kilovolts range. Transformer 104 steps the MV power down to low voltage (LV) power on LV lines 105, carrying voltage in the range of 100-240 VAC. Transformer 104 is typically designed to operate at very low frequencies in the range of 50-60 Hz. Transformer 104 does not typically allow high frequencies, such as signals greater than 100 KHz, to pass between LV lines 105 and MV lines 103. LV lines 105 feed power to customers via meters 106a-n, which are typically mounted on the outside of residences 102a-n. Although referred to as "residences," premises 102a-n may include any type of building, facility, or location where electric power is received and/or consumed. A breaker panel, such as panel 107, provides an interface between meter 106n and electrical wires 108 within residence 102n. Electrical wires 108 deliver power to outlets 110, switches 111, and other electric devices within residence 102n.

The power line topology illustrated in FIG. 1 may be used to deliver high-speed communications to residences 102a-n. In some implementations, power line communications modems or gateways 112a-n may be coupled to LV power lines 105 at meter 106a-n. PLC modems/gateways 112a-n may be used to transmit and receive data signals over MV/LV lines 103/105. Such data signals may be used to support metering and power delivery applications (e.g., smart grid applications), communication systems, high speed Internet, telephony, video conferencing, and video delivery, to name a few. By transporting telecommunications and/or data signals over a power transmission network, there is no need to install new cabling to each subscriber 102a-n. Thus, by using existing electricity distribution systems to carry data signals, significant cost savings are possible.

An illustrative method for transmitting data over power lines may use, for example, a carrier signal having a frequency different from that of the power signal. The carrier signal may be modulated by the data, for example, using an orthogonal frequency division multiplexing (OFDM) scheme or the like. The examples described below are based on IEEE 1901.2 or G3-PLC, however, other embodiments may use other OFDM based protocols now known or later developed.

PLC modems or gateways 112a-n at residences 102a-n use the MV/LV power grid to carry data signals to and from PLC data concentrator 114 without requiring additional wiring. Concentrator 114 may be coupled to either MV line 103 or LV line 105. Modems or gateways 112a-n may support applications such as high-speed broadband Internet links, narrowband control applications, low bandwidth data collection applications, or the like. In a home environment, for example, modems or gateways 112a-n may further enable home and building automation in heat and air conditioning, lighting, and security. Also, PLC modems or gateways 112a-n may be used to control AC or DC charging of electric vehicles and other appliances. PLC device 113 is an example device that is representative of one or more PLC devices that may be deployed within a residence or office, for example. Outside the premises, power line communication networks may provide street lighting control and remote power meter data collection, for example.

One or more data concentrators 114 may be coupled to control center 130 (e.g., a utility company) via network 120. Network 120 may include, for example, an IP-based network, the Internet, a cellular network, a WiFi network, a WiMax network, or the like. As such, control center 130 may be configured to collect power consumption and other types of relevant information from gateway(s) 112 and/or device(s) 113 through concentrator(s) 114. Additionally or alternatively, control center 130 may be configured to implement smart grid policies and other regulatory or commercial rules by communicating such rules to each gateway(s) 112 and/or device(s) 113 through concentrator(s) 114.

In some embodiments, each concentrator 114 may be seen as a base node for a PLC domain, each such domain comprising downstream PLC devices that communicate with control center 130 through a respective concentrator 114. For example, in FIG. 1, device 106a-n, 112a-n, and 113 may all be considered part of the PLC domain that has data concentrator 114 as its base node; although in other scenarios other devices may be used as the base node of a PLC domain. In a typical situation, multiple nodes may be deployed in a given PLC network, and at least a subset of those nodes may be tied to a common clock through a backbone (e.g., Ethernet, digital subscriber loop (DSL), etc.). Further, each PLC domain may be coupled to MV line 103 through its own distinct transformer similar to transformer 104.

Still referring to FIG. 1, meter 106, gateways 112, PLC device 113, and data concentrator 114 may each be coupled to or otherwise include a PLC modem or the like. The PLC modem may include transmitter and/or receiver circuitry to facilitate the device's connection to power lines 103, 105, and/or 108.

Figure 2:
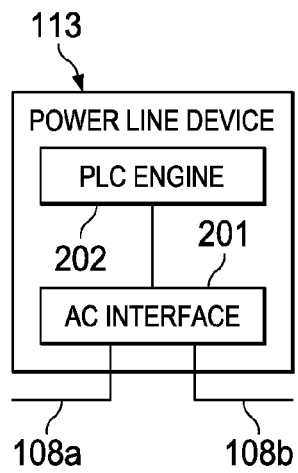
FIG. 2 is a block diagram of an example PLC device or modem for use in the PLC system of FIG. 1.

FIG. 2 is a block diagram of PLC device or modem 113 that may include an embodiment of the method for computing an effective SNR described herein. As illustrated, AC interface 201 may be coupled to electrical wires 108a and 108b inside of premises 112n in a manner that allows PLC device 113 to switch the connection between wires 108a and 108b off using a switching circuit or the like. In other embodiments, however, AC interface 201 may be connected to a single wire 108 (i.e., without breaking wire 108 into wires 108a and 108b) and without providing such switching capabilities. In operation, AC interface 201 may allow PLC engine 202 to receive and transmit PLC signals over wires 108a-b. As noted above, in some cases, PLC device 113 may be a PLC modem. Additionally or alternatively, PLC device 113 may be a part of a smart grid device (e.g., an AC or DC charger, a meter, etc.), an appliance, or a control module for other electrical elements located inside or outside of premises 112n (e.g., street lighting, etc.). PLC device 113 may also embody a modem that is coupled to provide data transfer across the PLC network for a data device, such as a computer, tablet, or various types of sensors and actuators, for example.

PLC engine 202 may be configured to transmit and/or receive PLC signals over wires 108a and/or 108b via AC interface 201 using a particular channel or frequency band. In some embodiments, PLC engine 202 may be configured to transmit OFDM signals, although other types of modulation schemes may be used. As such, PLC engine 202 may include or otherwise be configured to communicate with metrology or monitoring circuits (not shown) that are in turn configured to measure power consumption characteristics of certain devices or appliances via wires 108, 108a, and/or 108b. PLC engine 202 may receive such power consumption information, encode it as one or more PLC signals, and transmit it over wires 108, 108a, and/or 108b to higher-level PLC devices (e.g., PLC gateways 112n, data concentrators 114, etc.) for further processing. Conversely, PLC engine 202 may receive instructions and/or other information from such higher-level PLC devices encoded in PLC signals, for example, to allow PLC engine 202 to select a particular frequency band in which to operate. PLC engine 202 may be implemented using a digital signal processor (DSP), or another type of microprocessor, that is executing control software instructions stored in memory that is coupled to the microprocessor, for example, to perform various applications for power line device 113.

Figure 3:
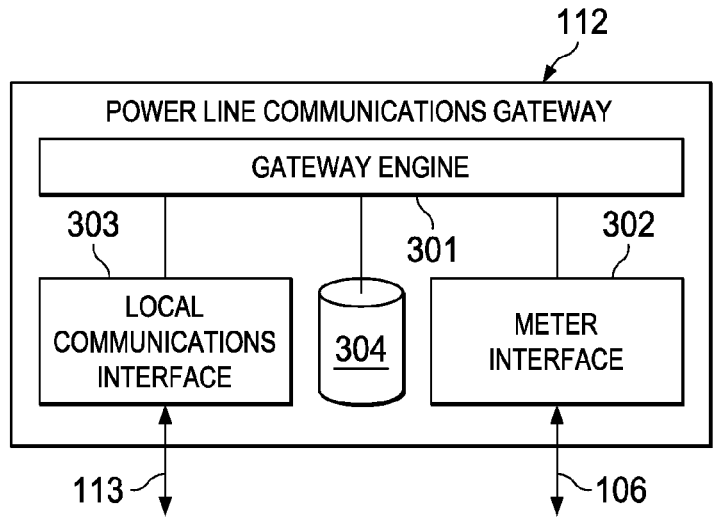
FIG. 3 is a block diagram of an example PLC gateway for use in the PLC system of FIG. 1.

FIG. 3 is a block diagram of PLC gateway 112 that may include an embodiment of the method for computing an effective SNR described herein. As illustrated in this example, gateway engine 301 is coupled to meter interface 302, local communication interface 303, and frequency band usage database 304. Meter interface 302 is coupled to meter 106, and local communication interface 303 is coupled to one or more of a variety of PLC devices such as, for example, PLC device 113. Local communication interface 303 may provide a variety of communication protocols such as, for example, ZIGBEE, BLUETOOTH, WI-FI, WI-MAX, ETHERNET, etc., which may enable gateway 112 to communicate with a wide variety of different devices and appliances. In operation, gateway engine 301 may be configured to collect communications from PLC device 113 and/or other devices, as well as meter 106, and serve as an interface between these various devices and PLC data concentrator 114. Gateway engine 301 may also be configured to allocate frequency bands to specific devices and/or to provide information to such devices that enable them to self-assign their own operating frequencies.

In some embodiments, PLC gateway 112 may be disposed within or near premises 102n and serve as a gateway to all PLC communications to and/or from premises 102n. In other embodiments, however, PLC gateway 112 may be absent and PLC devices 113 (as well as meter 106n and/or other appliances) may communicate directly with PLC data concentrator 114. When PLC gateway 112 is present, it may include database 304 with records of frequency bands currently used, for example, by various PLC devices 113 within premises 102n. An example of such a record may include, for instance, device identification information (e.g., serial number, device ID, etc.), application profile, device class, and/or currently allocated frequency band. As such, gateway engine 301 may use database 304 in assigning, allocating, or otherwise managing frequency bands assigned to its various PLC devices. PLC gateway engine 301 may be implemented using a digital signal processor (DSP), or another type of microprocessor, that is executing control software instructions stored in memory that is coupled to the microprocessor, for example, to perform various applications for gateway device 112.

Figure 4:
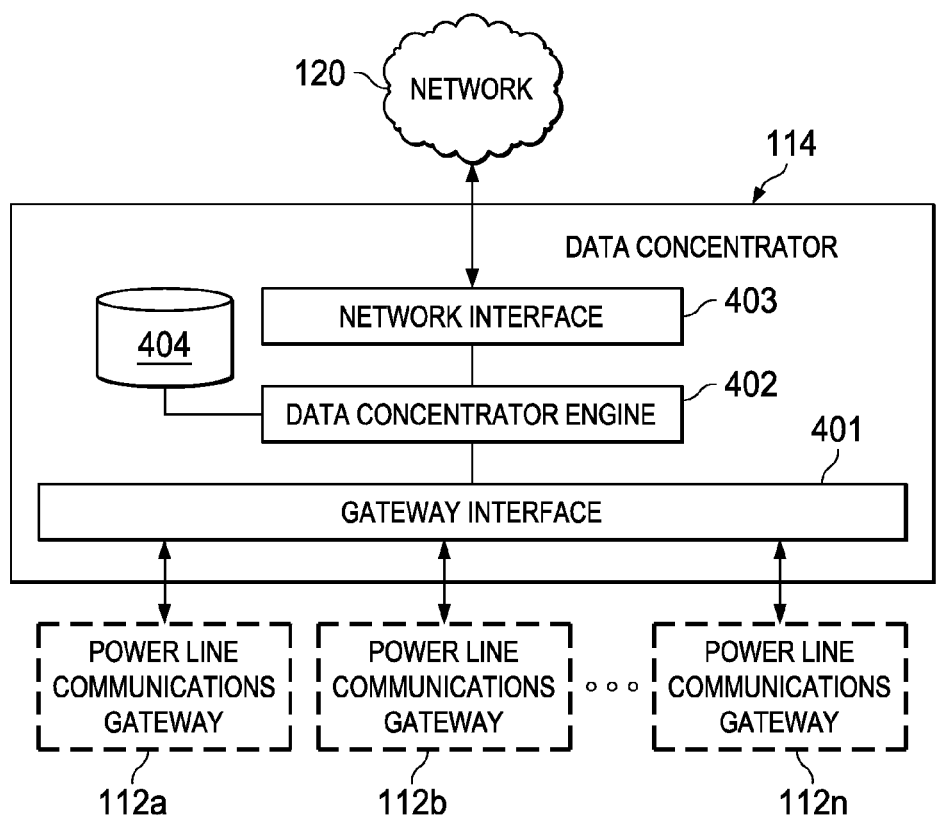
FIG. 4 is a block diagram of an example PLC data concentrator for use in the PLC system of FIG. 1.

FIG. 4 is a block diagram of a PLC data concentrator that may include an embodiment of the method for computing an effective SNR described herein. Gateway interface 401 is coupled to data concentrator engine 402 and may be configured to communicate with one or more PLC gateways 112a-n. Network interface 403 is also coupled to data concentrator engine 402 and may be configured to communicate with network 120. In operation, data concentrator engine 402 may be used to collect information and data from multiple gateways 112a-n before forwarding the data to control center 130. In cases where PLC gateways 112a-n are absent, gateway interface 401 may be replaced with a meter and/or device interface (now shown) configured to communicate directly with meters 116a-n, PLC devices 113, and/or other appliances. Further, if PLC gateways 112a-n are absent, frequency usage database 404 may be configured to store records similar to those described above with respect to database 304.

Periodic Impulsive Noise

Figure 5:
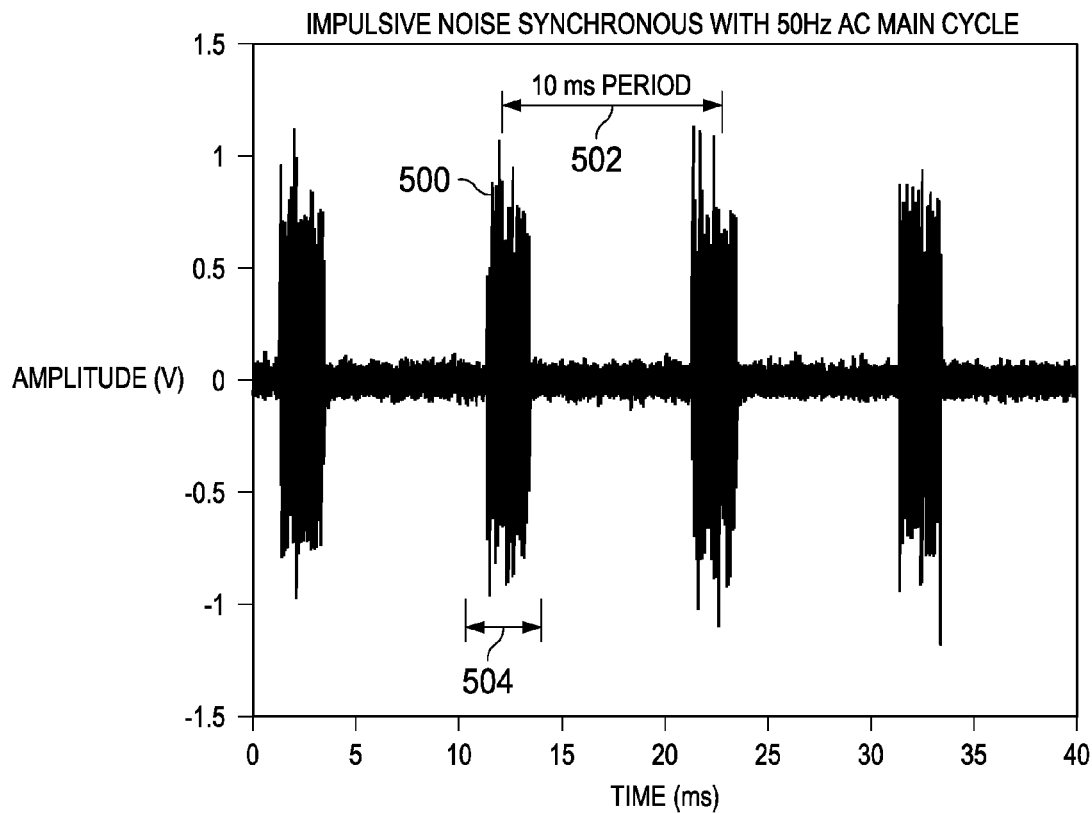
FIG. 5 is a plot illustrating impulse noise that may occur in an example PLC channel.

FIG. 5 illustrates an example plot of impulse noise that may appear on an example PLC channel that is periodic with respect to a 50 Hz main cycle. Periodic impulsive noise may limit communication performance of PLC, see e.g. T. Shongwe, A. J. H Vinck, H. C. Ferreira, "On Impulse Noise and its Models", ISPLC 2014. This type of noise consists of high power noise bursts that occur periodically with the AC mains cycle. Typically, at each zero crossing of the AC line voltage various electronic devices that are powered by the AC line voltage may generate noise when transistors or diodes turn on and turn off in response to each zero crossing event. Thus, a noise impulse 500 may occur every 10 ms in a 50 cycle system, as illustrated at 502. Similarly, noise impulses may occur every 8.33 ms at zero crossings in a 60 cycle system. Data transmitted during the noise bursts may therefore be heavily corrupted. In PLC, impulsive noise bursts 500 typically span 504 more than one OFDM symbol and have a periodicity equal to half the AC main cycle.

Furthermore in some instances, the load that a transmitter/receiver in each PLC device sees may have a cyclo-stationary dependence on the AC main cycle and thus the channel in some instances can behave like an erasure channel with a duty-cycle that is periodic with respect to the AC main-cycle.

A conventional structure of packets in a packet-based data transmission system comprises a preamble, a header, and a data payload. The preamble is typically used to estimate the channel impulse response, derive settings for the automatic gain control circuits, and perform carrier frequency offset estimation. It may also be used for synchronization and other physical layer functions. The header is typically used for conveying information about variable physical layer parameters such as the size of the data payload and the type of modulation being employed for a particular packet.

As mentioned above, a packet may span several intervals of interference. For example, a G3-CENELEC packet sampled at 400 kHz has an OFDM symbol consisting of 278 samples in which 22 samples correspond to the cyclic prefix. Each symbol is 695 usecs thus the entire packet may span several cycles of the 50/60 Hz AC wave.

In a typical communication system, the transmitter and receiver pair negotiate to determine the modulation that can be supported. This is typically done by sending a "sounding" packet with the lowest modulation and code rate that can be supported. As an example in IEEE 1901.2 and ITU-T G9903, the sounding packet is called a tone map request packet and is sent in ROBO modulation which corresponds to BPSK with a repetition or spreading by a factor of 4. Channel quality metrics may be used to estimate channel quality and thereby select the appropriate data rates. Most channel quality metrics are related to or estimated from the signal to noise ratio (SNR) measured at the receiver in an effort to set the data transmission rates of each channel.

In response to the sounding packet, a receiver may analyze the received packet to determine a SNR, which may then be returned to the transmitter that initiated the sounding packet to indicate the quality of the channel. Once the transmitter knows the quality of the channel that the receiver sees, the transmitter may select an appropriate modulation and coding scheme (MCS) to use for transmitting data packets to the receiver.

In wireless channels, the effective exponential SNR (EESM) is one method for determining the modulation and coding scheme (MCS) that a link can support; see, e.g., S. N. Donthi and N. B. Mehta, "An accurate model for EESM and its application to analysis of CQI feedback schemes and scheduling in LTE", *IEEE Transactions on Wireless Communications*, vol. 10 pp 3436-3448, October 2011. EESM is especially effective for multi-carrier systems when the SNR estimates from different sub-carriers need to be combined into one effective SNR estimate which is used to determine the MCS the link can support. Alternative methods, such as using a weighted geometric mean of the SNR estimates have also been disclosed; see, e.g., U.S. Pat. No. 7,295,517; Anim-Appiah, A. Batra, R. G. C Williams, "Method and apparatus for channel quality metric generations within a packet based multi-carrier modulation communication". However, unlike the wireless channel, the power-line channel typically exhibits periodic strong impulsive noise and thus the conventional link quality metric schemes need to be appropriately modified in order to take this into account. A mechanism for computing the effective SNR that a link can support in the presence of impulsive noise or erasures will now be disclosed.

Figure 6:
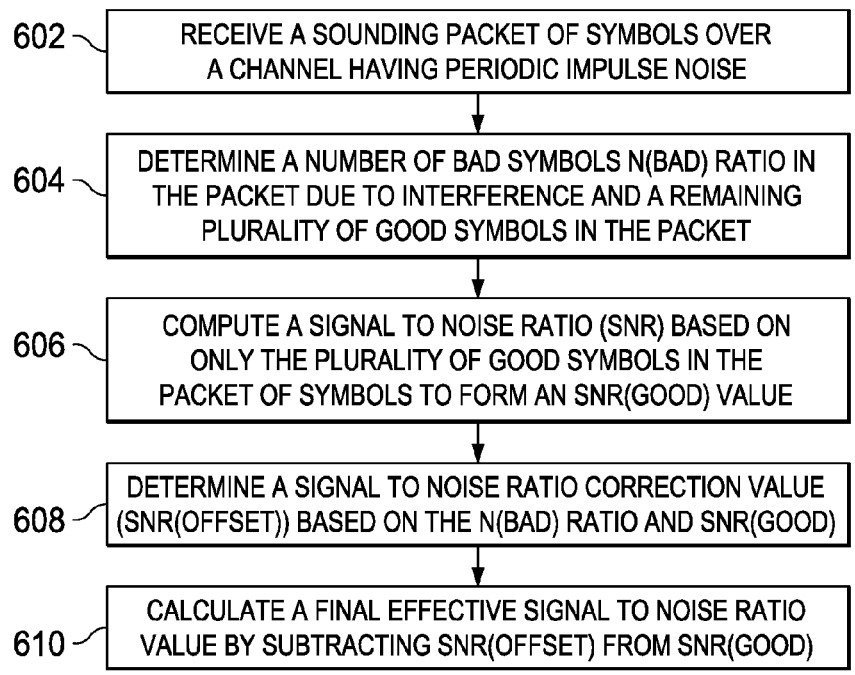
FIG. 6 is a flow chart illustrating a method for calculating SNR in a channel with impulsive noise or erasures.

FIG. 6 is a flow chart illustrating a method for calculating SNR in a channel with impulsive noise or erasures. This method may be implemented in either software or hardware or by a combination of software and hardware on a PLC network device.

Initially, a sounding packet is received 602 by a receiver in a PLC device, such as powerline device 113, referring back to FIG. 1, that is coupled to a powerline network as illustrated in FIG. 1, for example. The sounding packet may be sent by a transmitter in another powerline device coupled to the powerline network, such as gateway device 112n, for example. Typically, the transmitter will indicate that the packet is a sounding packet and will therefore expect a response that indicates the channel quality. As was described above in more detail, the PLC network will typically exhibit periodic impulse noise bursts.

Typically, a sounding packet will be sent when a PLC device is first discovered on a PLC network. Thereafter, sounding packets may be transmitted periodically in order to maintain a current status of channel quality. In some networks, the periodic rate may be set by a network administrator. In other networks, the periodic rate may be defined by a default value stored in a network control node, for example. In some embodiments, the periodic rate may be defined to be in the range of ten-twenty minutes, for example. However, larger or smaller intervals may be defined by a system designer or administrator, for example.

In some embodiments, a receiver may perform this method on a packet other than a sounding packet and provide unsolicited channel status to a transmitter. This may occur in instances in which the receiver notices that channel quality has changed significantly since the last channel quality update, for example.

Processing logic coupled to the receiver in the PLC device may then determine 604 the number of bad data symbols $N_{bad}$ in a receive packet that exhibit impulsive noise or erasure. This may be done in several ways. In some embodiments the RMS value for each data symbol may be compared to a nominal RMS value and if it varies more than a predefined threshold then that symbol is declared to be a "bad" symbol. In another embodiment, the raw SNR values for each subcarrier in a received symbol may be computed and if some function of them, e.g., arithmetic average or geometric average, is below a threshold then that particular symbol is declared to be bad. Other known or later developed techniques may be used to determine that a symbol is bad.

Figure 8A:
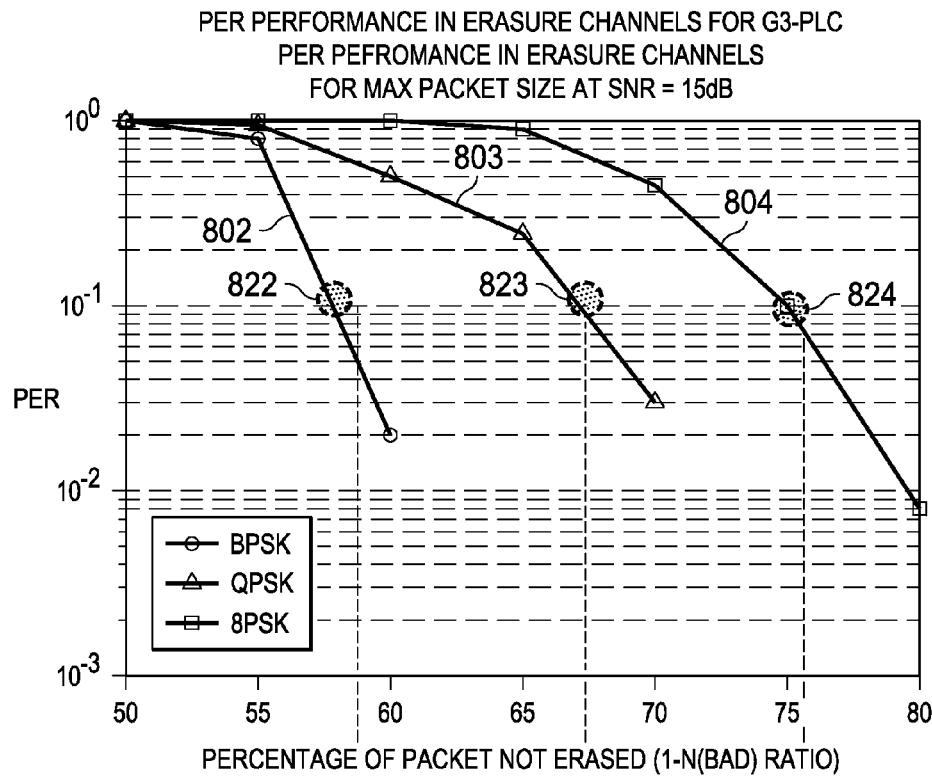
FIGS. 8A and 8B are plots illustrating modeling of channel performance.

Processing logic coupled to the receiver in the PLC device may then calculate 604 an Nbad ratio. In some embodiments, the $N_{bad}$ ratio may be a ratio of the "bad" data symbols in a packet to the total number of data symbols ($N_{total}$), ($N_{bad}/N_{total}$). In another embodiment, the $N_{bad}$ ratio may be a ratio of the "bad" data symbols in a packet to the number of "good" data symbols ($N_{good}$), ($N_{bad}/N_{good}$). In either case, this ratio may be used to determine how much of an SNR offset needs to be subtracted from an estimated SNR ($SNR_{estimategood}$) to get the total effective SNR of the link. As this ratio moves goes towards zero and for a high $SNR_{estimategood}$ value, higher modulations can be supported. As an example, FIG. 8A illustrates the performance (packet error rate) for three different modulations in G3-PLC versus the percentage of "good" symbols in a packet i.e. [$N_{total}-N_{bad}$]/$N_{total}$ In this example, plot line 802 illustrates BPSK modulation, plot line 803 illustrates QPSK modulation, and plot line 804 illustrates 8PSK modulation. The packet error ratio (PER) is the number of incorrectly received data packets divided by the total number of received packets. A packet is declared incorrect if at least one bit is erroneous. Clearly the effect of having more erasures or bad symbols results in a PER degradation for any given modulation scheme.

Processing logic coupled to the receiver in the PLC device may then compute 606 an estimated SNR ($SNR_{estimategood}$) based on only the "good" symbols. This may be done using the EESM method, the method outlined in U.S. Pat. No. 7,295,517, or it may simply be the arithmetic, geometric or harmonic average of the SNR estimates in all the good symbols or some combination thereof. Other known or later developed techniques may also be used to determine the effective SNR using only the good symbols in the sounding packet.

Processing logic coupled to the receiver in the PLC device may then determine 608 an $SNR_{offset}$ to be applied. The $SNR_{offset}$ is a function of both the $N_{bad}$ ratio and the $SNR_{estimategood}$, as indicated by equation (1).

$$SNR_{offset}=f(N_{bad}\text{ ratio},SNR_{estimategood}) \quad (1)$$

In equation (1), f(.) is a function that may be predetermined and depends on the system parameters i.e., the modulation, type of interleaver, type of coding etc. In some embodiments f(.) may simply be a linear fit that depends on $N_{bad}/N_{total}$, or on $N_{bad}/N_{good}$, for example, with the linear fit parameters (the slope (m) and y intercept (c) values in y=mx+c) being further dependent on the $SNR_{estimategood}$. In some embodiments the function f(.) may be implemented by way of a look-up table based on the inputs of $N_{bad}/N_{total}$ and $SNR_{estimategood}$. Determination of function f(.) will be described in more detail below with reference to FIG. 7.

Referring still to FIG. 6, processing logic coupled to the receiver in the PLC device may then calculate 610 an effective SNR for the link using equation (2).

$$SNR_{effective}=SNR_{estimategood}-SNR_{offset} \quad (2)$$

The $SNR_{effective}$ may be thought of as the "awgn" (Add White Gaussian Noise) SNR for the link and can be used to determine the modulation and coding scheme that the link can support based on the target packet error rate performance desired.

This method may be applied to all frequency bands using the G3-PLC standard. This method may also be applied to all frequency bands using the IEEE 1901.2, for example.

Figure 7:
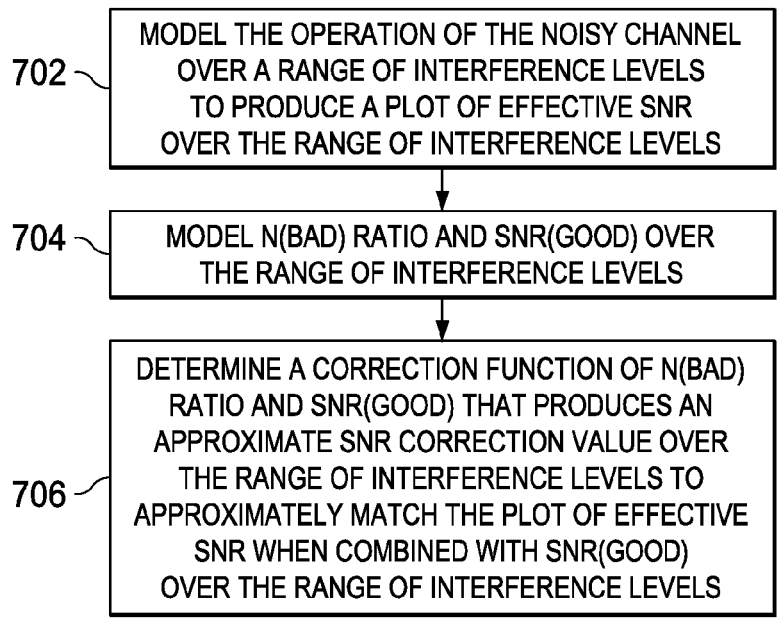
FIG. 7 is a flow chart illustrating a method to predetermine a function that may be used to determine an SNR correction value.
Figure 8B:
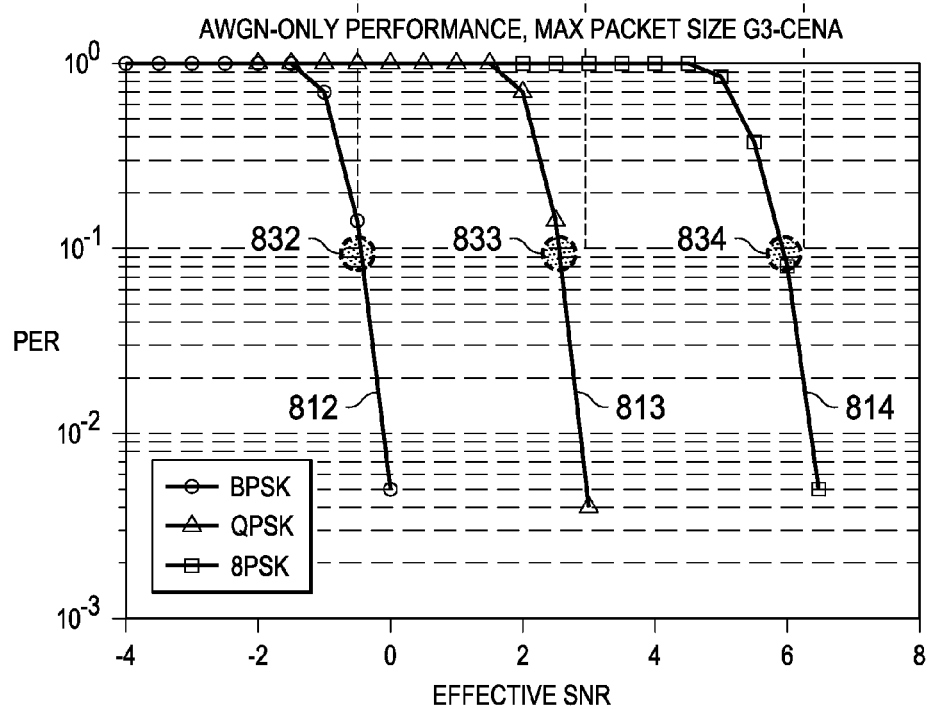

FIG. 7 is a flow chart illustrating a method to predetermine a function that may be used to determine an SNR correction value. In this example, the operation of the noisy channel over a range of interference levels is modeled 702 to produce a plot of effective SNR. FIG. 8B illustrates an example of modeling process 702. In this example, plot line 812 illustrates BPSK modulation, plot line 813 illustrates QPSK modulation, and plot line 814 illustrates 8PSK modulation. For each type of modulation, the SNR is varied over a range by simulating operation of a channel with added white Gaussian noise (awgn). Packet error rate at various points is determined and plotted to form the plot lines.

Next, N(bad) ratio and SNR(good) is modeled 704 over the range of interference levels, as illustrated by FIG. 8A. In this example, plot line 802 illustrates BPSK modulation, plot line 803 illustrates QPSK modulation, and plot line 804 illustrates 8PSK modulation. The x-axis represents that percentage of a packet that is not erased. In other words, this is $N_{good}/N_{total}$ ratio or ($N_{total}-N_{bad}$)/$N_{total}$ or ($1-N_{bad}/N_{total}$) for example. Again, for each type of modulation, packet error rate at various points is determined and plotted to form the plot lines.

A correction function of N(bad) ratio and SNR(good) is then determined that produces an approximate SNR correction value over the range of interference levels to approximately match the plot of effective SNR when combined with SNR(good) over the range of interference levels. This may be done by selecting corresponding points based on a same PER value from each of FIGS. 8A and 8B, such as points 822 and 832, 823 and 833, and 824 and 834, for example. These corresponding points provide a correlation between SNR and N(bad) ratio.

Figure 9:
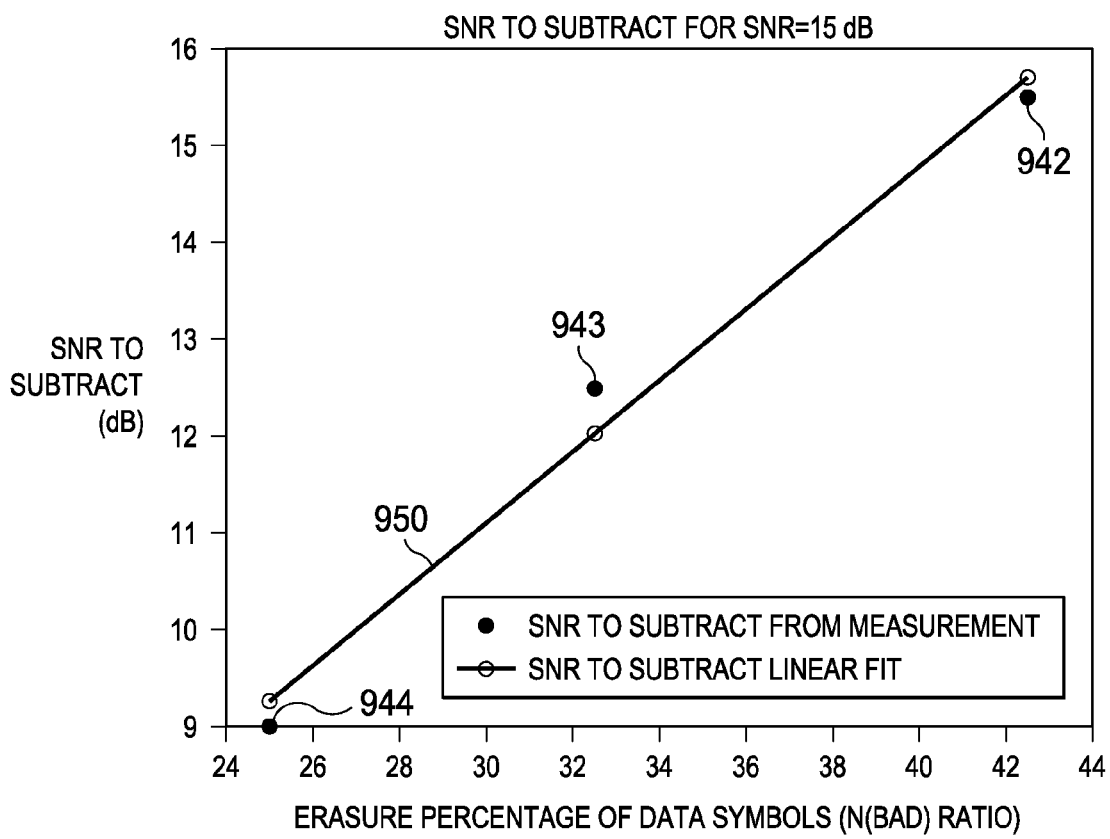
FIG. 9 is an example of a function that may be used to determine an SNR correction value.

In this example, point 822 from FIG. 8A for PER=$10^{-1}$ at N(bad) ratio=42% and corresponding point 832 from FIG. 8B for PER=$10^{-1}$ at SNR=-0.5 may be combined to show that at N(bad) ratio=42%, the effective SNR is only -0.5. However, the calculated SNR(good) at this N(bad) ratio came out to be approximately 15 dB when measured only over the good symbols. Thus an SNR offset of approximately 15.5 dB needs to be subtracted from SNR(good). This is illustrated in FIG. 9 at point 942. Similarly, points 943 and 944 may be determined using point pairs 823 and 833, and 824 and 834. A straight line 950 having a function y=mx+c may then be fit to these points with appropriate parameters to represent function f(.). In some embodiments the straight line parameters (m and c) are function of SNR. As an example in FIG. 9, the straight line parameters (m and c) are computed for SNR(good)=15 dB. In another embodiment, since the PER may have a further dependency on the packet length or interleaver settings, the straight line parameters (m and c) may be functions of both SNR and packet length. In some embodiments this may be stored in a 2D table with the row index corresponding to SNR(good) and the column index corresponding to the packet length with the entry equal to the desired straight line fit (m and c) parameters, for example.

More complex models may also be predetermined to cover a wider range of channel conditions. In such cases, a table lookup may be used to represent the resultant function, for example.

Figure 10:
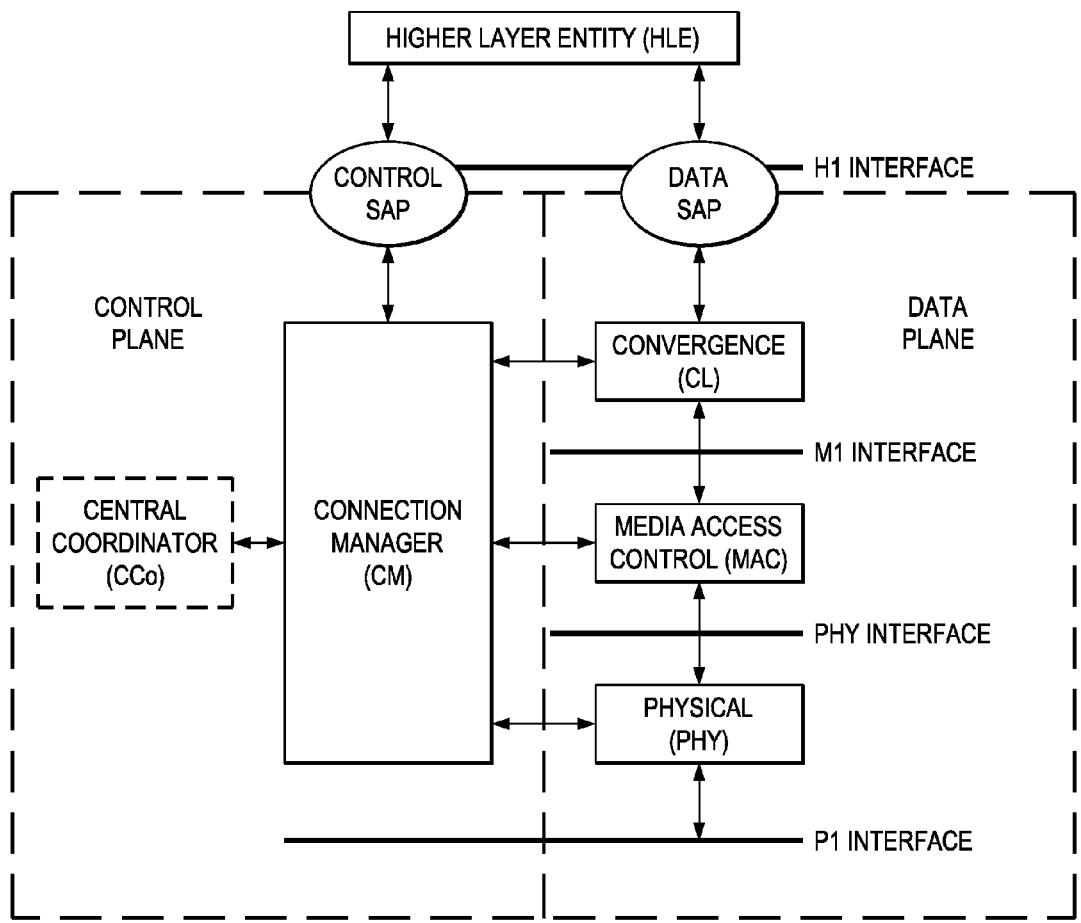
FIG. 10 is an architectural diagram of a power line communication system, illustrating the PHY and MAC layers.

FIG. 10 is an architectural diagram of a power line communication system, illustrating the PHY (physical) and MAC (media access control) layers used for data packet management as defined by the G3-PLC and IEEE 1901 standards. The Higher Layer Entities (HLEs) above the H1 (Host) Interface may be bridges, applications or servers that provide off-chip services to clients below the H1 Interface. The Data Service Access Point (SAP) accepts Ethernet format packets, so all IP based protocols are easily handled. The PLC communicating standards define two planes as shown in FIG. 10. The data plane provides the traditional layered approach with the M1 interface between the Convergence Layer (CL) and the MAC, and the PHY interface between the MAC and the PHY. In the control plane, the MAC is a monolith without conventional layering. In FIG. 10 it is labeled as the Connection Manager (CM) since that is its primary function. The approach adopted for the control plane was chosen to provide more efficient processing and to provide implementers greater flexibility for innovation. Although part of the control plane may be in all stations, the Central Coordinator (CCo) entity may be active in only one station in a single PLC network.

In order to better understand embodiments of the invention, an overview of IEEE 1901.2 will now be described. Additional details may be found in various IEEE documents. A more detailed overview is provided in "An Overview, History, and Formation of IEEE 1901.2 for Narrowband OFDM PLC", Jul. 2, 2013, which is incorporated by reference herein.

Details on PHY building blocks have been presented in various IEEE publications. The ultimate result is now a universal PHY structure for NB PLC. The fundamental PHY elements in the transceiver start with the scrambler. The scrambler's function is to randomize the incoming data. Both G3-PLC and PRIME utilize the same generator polynomial, as illustrated in equation (3).

$$s(x)=x^7+x^4+1 \quad (3)$$

Two levels of error correction follow, starting with a Reed-Solomon (RS) encoder where typically data from the scrambler is encoded by shortened systematic Reed-Solomon (RS) codes using Galois Field (GF). The second level of error correction, employed by both G3-PLC and PRIME, uses a 1/2 rate convolutional encoder with constraint rate K=7. The convolutional encoder is followed by a two-dimensional (time and frequency) interleaver. Together these blocks significantly improve robustness and overall system performance in the presence of noise.

Following the FEC (forward error correction) block is the OFDM modulator. The modulation technique of PRIME and G3-PLC was selected to be used in IEEE 1901.2. The defined modulator describes the modulation (BPSK, QPSK, 8PSK, etc.); the constellation mapping; the number of repetitions (4, 6, etc.); the type of modulation (differential, coherent); the frequency domain pre-emphasis; OFDM generation (IFFT, with cyclic prefix); and windowing.

Structure of the physical frames is defined according to the fundamental system parameters, including the number of FFT points and overlapped samples, the size of cyclic prefixes, the number of symbols in the preamble, and the sampling frequency. The physical layer supports two types of frames: the data frame and the ACK/NACK frame. Each frame starts with a preamble used for synchronization and detection, as well as automatic gain control (AGC) adaptation. The preamble is followed by data symbols allocated to the frame control header (FCH) with the number of symbols depending on the number of carriers used by the OFDM modulation.

The FCH is a data structure transmitted at the beginning of each data frame. It contains information regarding modulation and the length of the current frame in symbols. The FCH also includes a frame control checksum (CRC, or cyclic redundancy check), which is used for error detection. The size of the CRC depends on the frequency band being utilized.

The PHY layer includes an adaptive tone mapping (ATM) feature to optimize maximum robustness. The added ATM feature is implemented first by estimating the SNR of the received signal subcarriers (tones), and then adaptively selecting the usable tones and the optimum modulation and coding type to ensure reliable communication over the powerline channel. Tone mapping also specifies the power level for the remote transmitter and the gain values to be applied for the various sections of the spectrum. The per-carrier quality measurement enables the system to adaptively avoid transmitting data on subcarriers with poor quality. Using a tone map indexing system, the receiver understands which tones are used by the transmitter to send data and which tones are filled with dummy data to be ignored. The goal of the ATM is to achieve the greatest possible throughput under the given channel conditions between the transmitter and the receiver.

A transmission protocol between the MAC and the PHY layer includes different data primitives accessible between the MAC and PHY layers. Several primitives may be provided. A PD-DATA.request primitive is generated by a local MAC sublayer entity and issued to its PHY entity to request the transmission of a PHY service data unit (PSDU). A PD-DATA.confirm primitive confirms the end of the transmission of a PSDU from the local PHY entity to a peer PHY entity. A PD-DATA.indication primitive indicates the transfer of a PSDU from the PHY to the local MAC sublayer entity. The PHY layer may include a management entity called the PLME (physical layer management entity). The PLME provides layer-management service interfaces functions. It is also responsible for maintaining the PHY information base.

The MAC layer is an interface between the logical link control (LLC) layer and the PHY layer. The MAC layer regulates access to the medium by using CSMA/CA (carrier sense, multiple access with collision avoidance). It provides feedback to upper layers in the form of positive and negative acknowledgements (ACK or NACK) and also performs packet fragmentation and reassembly. Packet encryption/decryption is carried out by the MAC layer as well.

A tone map response MAC command may be provided to utilize adaptive tone mapping. The MAC sublayer generates a tone map response command if the tone map request (TMR) bit of a received packet segment control field is set. This means that a packet originator has requested tone map information from a destination device. The destination device must estimate this particular communication link between two points and report the optimal PHY parameters. The tone map information includes the index associated with PHY parameters: the number of used tones and allocation (tone map), the modulation mode, the TX power control parameters, and the link quality indicator (LQI).

The Physical Layer (PHY) may operate in the frequency range of less than 500 kHz and provide up to 500 kbps PHY channel rate. An IEEE 1901.2 device may send MAC data frames that are greater in length then 400 bytes, while a G3 device is limited to a maximum of 400 bytes.

Figure 11:
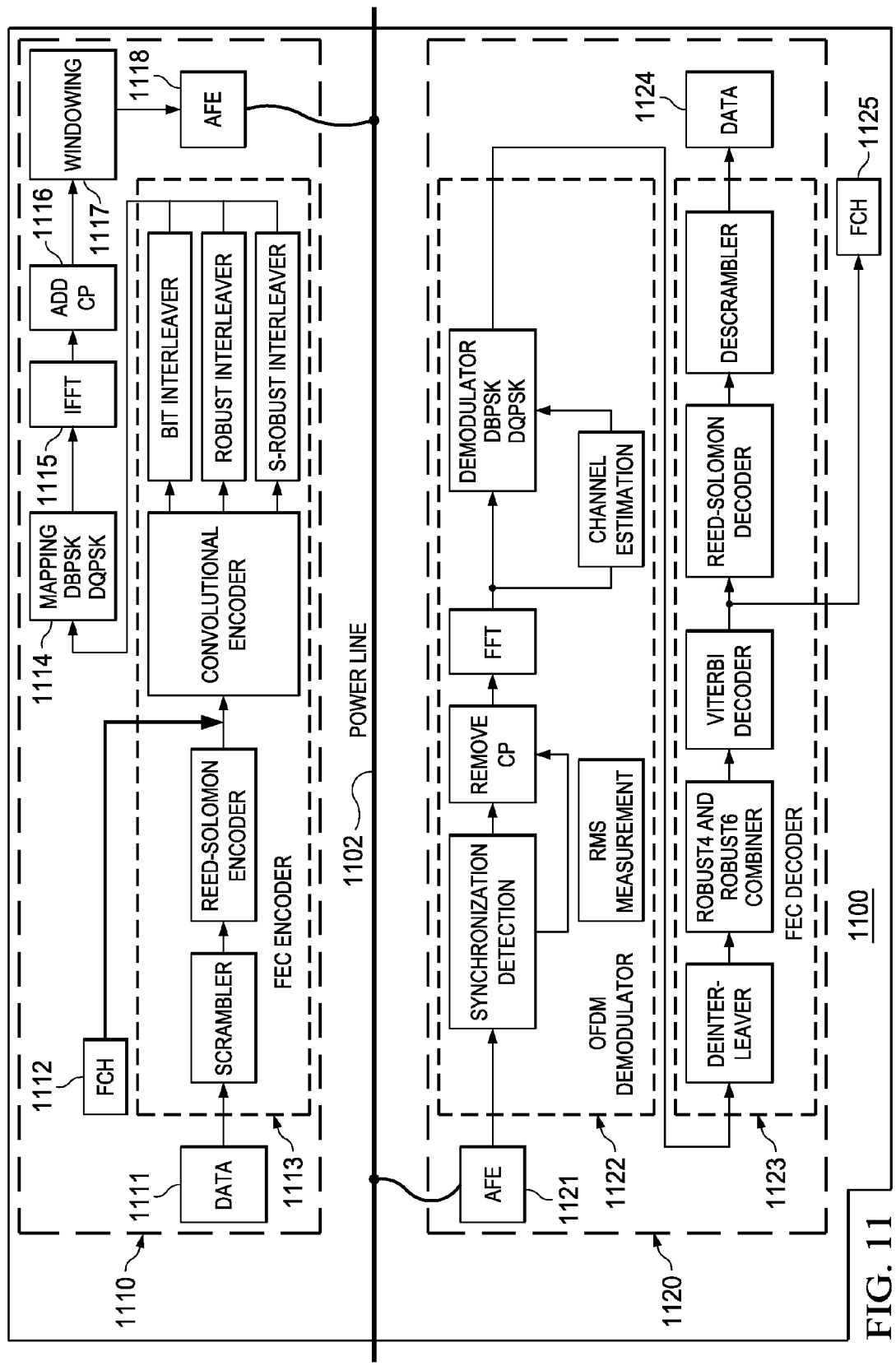
FIG. 11 illustrates a block diagram of an exemplary low cost, low power G3 and 1901.2 compatible device.

FIG. 11 is a block diagram of an exemplary low cost, low power G3 and 1901.2 compatible device 1100 illustrating an OFDM transmitter 1110 and receiver 1120 for use in a power line communication node for PLC over a power line 1102. As discussed above, the power line channel is very hostile. Channel characteristics and parameters vary with frequency, location, time and the type of equipment connected to it. The lower frequency regions from 10 kHz to 200 kHz used in G3 PLC and in IEEE 1901.2 are especially susceptible to interference. Furthermore, the power line is a very frequency selective channel. Besides background noise, it is subject to impulsive noise often occurring at 50/60 Hz, and narrowband interference and group delays up to several hundred microseconds.

As described in more detail above, OFDM is a modulation technique that can efficiently utilize the limited bandwidth specified by CENELEC and IEEE 1901.2, and thereby allows the use of advanced channel coding techniques. This combination facilitates a very robust communication over a power line channel.

The CENELEC bandwidth is divided into a number of sub-channels, which can be viewed as many independent PSK modulated carriers with different non-interfering (orthogonal) carrier frequencies. Convolutional and Reed-Solomon coding provide redundancy bits allowing the receiver to recover lost bits caused by background and impulsive noise. A time-frequency interleaving scheme may be used to decrease the correlation of received noise at the input of the decoder, providing diversity.

Data 1111 and a frame control header 1112 are provided by an application via a media access layer (MAC) of the communication protocol. An OFDM signal is generated by performing IFFT (inverse fast Fourier transform) 1115 on the complex-valued signal points that are produced by differentially encoded phase modulation from forward error correction encoder 1113 using Reed Solomon encoding. Tone mapping 1114 is performed to allocate the signal points to individual subcarriers. An OFDM symbol is built by appending a cyclic prefix (CP) 1116 to the beginning of each block generated by IFFT 1115. The length of a cyclic prefix is chosen so that a channel group delay will not cause successive OFDM Symbols or adjacent sub-carriers to interfere. The OFDM symbols are then windowed 1117 and impressed on power line 1102 via analog front end 1118. AFE 1118 provides isolation of transmitter 1110 from the 50/60 Hz power line voltage.

Similarly, receiver 1120 receives OFDM signals from power line 1102 via AFE 1121 that isolates receiver 1120 from the 50/60 HZ power line voltage. OFDM demodulator 1122 removes the CP, converts the OFDM signal to the time domain using FFT (Fast Fourier Transform), and performs demodulation of the phase shift keyed (DBPSK, DQPSK) symbols. FEC decoder 1123 performs error correction using Reed Solomon decoding and then descrambles the symbols to produce received data 1124. Frame control header 1125 information is also produced by FEC decoder 1120, as defined by the G3 and IEEE 1901.2 PLC standards.

A blind channel estimation technique may be used for link adaptation. Based on the quality of the received signal, the receiver decides on the modulation scheme to be used, as defined in the PLC standards and may use the SNR correction techniques disclosed herein. Moreover, the system may differentiate the subcarriers with bad SNR (signal to noise ratio) and not transmit data on them.

Transmitter 1110 and receiver 1120 may be implemented using a digital signal processor (DSP), or another type of microprocessor, that is executing control software instructions stored in memory that is coupled to the microprocessor, for example, to perform FEP encoding, mapping and OFDM modulation, demodulation, and FEP decoding. In other embodiments, portions or all of the transmitter or receiver may be implemented with hardwired control logic, for example. Transmitter 1110 and receiver 1120 may be implemented on a single integrated circuit using known semiconductor processing techniques. The analog front ends 1118, 1121 require analog logic and isolation transformers that can withstand the voltage levels present on the power line.

A G3 and IEEE 1901.2 PLC system is specified to have the ability to communicate in both low voltage (LV) power lines, typically 100-240 VAC, as well as medium voltage (MV) power lines (up to approximately 12 kV, by crossing LV/MV transformers. This means that the receiver on the LV side must be able to detect the transmitted signal after it has been severely attenuated as a result of going through a MV/LV transformer. As the signal goes through the transformer it is expected to experience overall severe attenuation in its power level as well as frequency-dependent attenuation that attenuates higher frequencies. Both transmitter and receiver have mechanisms to compensate for this attenuation. The transmitter has the capability to adjust its overall signal level as well as shape its power spectrum based on tone map information provided by a target receiver, while the receiver has both an analog and digital AGC (Automatic Gain Control) in order to achieve enough gain to compensate for the overall attenuation.

Other Embodiments

In the description herein, some terminology is used that is specifically defined in the G3 and IEEE 1901.2 standards and/or is well understood by those of ordinary skill in the art in PLC technology. Definitions of these terms are not provided in the interest of brevity. Further, this terminology is used for convenience of explanation and should not be considered as limiting embodiments of the invention to the G3 and IEEE 1901.2 standards. One of ordinary skill in the art will appreciate that different terminology may be used in other encoding standards without departing from the described functionality.

Embodiments may be operated on various frequency bands by determining a set of packet lengths that provide successful communication for the particular frequency band, such as CENELEC A, CENELEC B, ARIB or FCC band, for example.

Embodiments of the receivers and transmitters and methods described herein may be provided on any of several types of digital systems: digital signal processors (DSPs), general purpose programmable processors, application specific circuits, or systems on a chip (SoC) such as combinations of a DSP and a reduced instruction set (RISC) processor together with various specialized accelerators. A stored program in an onboard or external (flash EEP) ROM or FRAM may be used to implement aspects of the signal processing.

The techniques described in this disclosure may be implemented in hardware, software, firmware, or any combination thereof. Various combinations of hardware and/or software state machines may be used. If implemented in software, the software may be executed in one or more processors, such as a microprocessor, application specific integrated circuit (ASIC), field programmable gate array (FPGA), software state machines, or digital signal processor (DSP), for example. The software that executes the techniques may be initially stored in a computer-readable medium such as a flash drive, a compact disc (CD), a diskette, a tape, a file, memory, or any other computer readable storage device and loaded at a manufacturing site for execution in the processor. In some cases, the software may also be sold in a computer program product, which includes the computer-readable medium and packaging materials for the computer-readable medium. In some cases, the software instructions may be distributed via removable computer readable media (e.g., floppy disk, optical disk, flash memory, USB key), via a transmission path from computer readable media on another digital system, etc.

Certain terms are used throughout the description and the claims to refer to particular system components. As one skilled in the art will appreciate, components in digital systems may be referred to by different names and/or may be combined in ways not shown herein without departing from the described functionality. This document does not intend to distinguish between components that differ in name but not function. In the discussion and in the claims, the terms "including" and "comprising" are used in an open-ended fashion, and thus should be interpreted to mean "including, but not limited to . . . . " Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Although method steps may be presented and described herein in a sequential fashion, one or more of the steps shown and described may be omitted, repeated, performed concurrently, and/or performed in a different order than the order shown in the figures and/or described herein. Accordingly, embodiments of the invention should not be considered limited to the specific ordering of steps shown in the figures and/or described herein.

It is therefore contemplated that the appended claims will cover any such modifications of the embodiments as fall within the true scope and spirit of the invention.

What is claimed is:

1. A method for estimating signal to noise ratio in a noisy channel by a device in a network, the method comprising:
  receiving by the device a packet of symbols over a channel having periodic impulse noise;
  determining a number of bad symbols N(bad) ratio in the packet due to interference and a remaining plurality of good symbols in the packet;
  computing a signal to noise ratio (SNR) based on only the plurality of good symbols in the packet of symbols to form an SNR(good) value;
  determining an SNR correction value (SNR(offset)) as a function of the N(bad) ratio and the SNR(good) value; and
  calculating an effective SNR value by adjusting the SNR (good) value according to SNR(offset).

2. The method of claim 1, in which the effective SNR value is sent to another device in the network for use by the other device to select a modulation and coding scheme (MCS); and
  receiving a packet from the other device using the selected MCS.

3. The method of claim 1, in which determining the SNR correction value uses a predetermined correction function, in which the correction function is predetermined by:
  modeling the operation of the noisy channel over a range of interference levels to produce a plot of effective SNR over the range of interference levels;
  modeling N(bad) ratio and SNR(good) over the range of interference levels; and
  determining a correction function of N(bad) ratio and SNR (good) that produces an approximate SNR correction value over the range of interference levels to approximately match the plot of effective SNR when combined with SNR(good) over the range of interference levels.

4. The method of claim 3, in which the correction function is a polynomial function with the input arguments (Nbad/Ngood) and SNR(good).

5. The method of claim 4, in which the polynomial function is a linear fit.

6. The method of claim 3, in which the correction function is a table lookup function.

7. A power line communication (PLC) device comprising:
  an application processor coupled to a memory circuit;
  a transceiver coupled to the application processor, in which the transceiver includes an analog front end configured to receive OFDM symbols from a power line, and a demodulator configured to demodulate the OFDM symbols to produce data;
  wherein the PLC device is configured to receive data frames from a remote transmitter via a power line using a communication protocol, such that the receiver is configured to:
  receive a packet of symbols over a channel having periodic impulse noise;
  determine a number of bad symbols N(bad) ratio in the packet due to interference and a remaining plurality of good symbols in the packet;
  compute a signal to noise ratio (SNR) based on only the plurality of good symbols in the packet of symbols to form an SNR(good) value;
  determine an SNR correction value (SNR(offset)) as a function of the N(bad) ratio and the SNR(good) value; and
  calculate an effective SNR value by adjusting the SNR (good) value according to SNR(offset).

8. The PLC device of claim 7, in which the transceiver includes an analog back end configured to transmit OFDM symbols onto a power line, and a modulator configured to modulate the OFDM symbols to represent data; and
  in which the PLC is configured to transmit the effective SNR value to another device in the network for use by the other device to select a modulation and coding scheme (MCS); and
  in which the PLC device is configured to receive a packet from the other device using the selected MCS.

9. The PLC device of claim 7, in which determining the SNR correction value uses a predetermined correction function stored in the memory circuit coupled to the application processor, in which the correction function is predetermined by:
  modeling the operation of the noisy channel over a range of interference levels to produce a plot of effective SNR over the range of interference levels;
  modeling N(bad) ratio and SNR(good) over the range of interference levels; and
  determining a correction function of N(bad) ratio and SNR (good) that produces an approximate SNR correction value over the range of interference levels to approximately match the plot of effective SNR when combined with SNR(good) over the range of interference levels.

10. The PLC device of claim 7, in which the correction function is a polynomial function with the input arguments (Nbad/Ngood) and SNR(good).

11. The PLC device of claim 10, in which the polynomial function is a linear fit.

12. The PLC device of claim 9, in which the correction function is a table lookup function.

13. A non-transitory computer-readable medium storing software instructions that, when executed by a processor, cause a method for estimating signal to noise ratio in a noisy channel by a device in a network to be performed, the method comprising:
   receiving a packet of symbols over a channel having periodic impulse noise;
   determining a number of bad symbols N(bad) ratio in the packet due to interference and a remaining plurality of good symbols in the packet;
   computing a signal to noise ratio (SNR) based on only the plurality of good symbols in the packet of symbols to form an SNR(good) value;
   determining an SNR correction value (SNR(offset)) as a function of the N(bad) ratio and the SNR(good) value; and
   calculating an effective SNR value by adjusting the SNR(good) value according to SNR(offset).

14. The method of claim 13, in which the effective SNR value is sent to another device in the network for use by the other device to select a modulation and coding scheme (MCS); and
   receiving a packet from the other device using the selected MCS.

15. The method of claim 13, in which determining the SNR correction value uses a predetermined correction function, in which the correction function is predetermined by:
   modeling the operation of the noisy channel over a range of interference levels to produce a plot of effective SNR over the range of interference levels;
   modeling N(bad) ratio and SNR(good) over the range of interference levels; and
   determining a correction function of N(bad) ratio and SNR(good) that produces an approximate SNR correction value over the range of interference levels to approximately match the plot of effective SNR when combined with SNR(good) over the range of interference levels.

16. The method of claim 15, in which the correction function is a polynomial function with the input arguments (Nbad/Ngood) and SNR(good).

17. The method of claim 16, in which the polynomial function is a linear fit.

18. The method of claim 15, in which the correction function is a table lookup function.

* * * * *